United States Patent [19]

Stoner

[11] Patent Number: 4,611,996
[45] Date of Patent: Sep. 16, 1986

[54] TEACHING MACHINE

[76] Inventor: Donald W. Stoner, 6028 Harvey Way, Lakewood, Calif. 90713

[21] Appl. No.: 692,863

[22] Filed: Jul. 18, 1985

Related U.S. Application Data

[63] Continuation of Ser. No. 289,130, Aug. 1, 1983, abandoned.

[51] Int. Cl.⁴ .............................................. G09B 7/00
[52] U.S. Cl. .................................... 434/202; 434/201; 434/327; 434/323; 434/335; 273/138 A; 273/143 R
[58] Field of Search ............... 434/201, 202, 232, 327, 434/332, 335; 273/138 A, 143 R; 364/419, 717

[56] References Cited

U.S. PATENT DOCUMENTS

| | | | |
|---|---|---|---|
| 2,742,713 | 4/1956 | Villanueva | 434/332 |
| 3,300,875 | 1/1967 | Nisbet | 434/325 |
| 3,460,270 | 8/1969 | Blitz et al. | 434/228 |
| 3,546,791 | 12/1970 | Koos et al. | 434/323 |
| 3,668,789 | 6/1972 | Ferguson | 434/332 |
| 4,170,832 | 10/1979 | Zimmerman | 434/323 |
| 4,247,895 | 1/1981 | Weber | 434/201 |
| 4,323,241 | 4/1982 | Deutsch | 273/121 A |
| 4,337,047 | 6/1982 | Hatta | 434/201 |
| 4,340,374 | 7/1982 | Culley | 434/201 |
| 4,340,375 | 7/1982 | Sakaue et al. | 434/201 |
| 4,375,286 | 3/1983 | Seitz et al. | 273/313 |

FOREIGN PATENT DOCUMENTS 2072395  9/1981  United Kingdom ....... 273/DIG. 28

Primary Examiner—Leo P. Picard
Attorney, Agent, or Firm—Joseph E. Mueth

[57] ABSTRACT

A teaching machine comprising circuitry to select and a display to present problems to a student, switches to receive said student's response, circuitry to determine if the answer is correct and, in one embodiment, an electronic game to reward said student for correct response by allowing said student to play a game. The same machine also having, in one embodiment, circuitry for detecting and concentrating on student's problem areas using a recurrence probability associated with each of a plurality of problems, whether math, spelling, or other, which is modified by the response of the student depending on said student's speed and correctness. Each problem to be presented to said student being selected in a random type manner using the probabilities associated with each problem. The teaching machine also having, in one embodiment, circuitry to modify the time in which the student is allowed to answer based on said student's response.

23 Claims, 4 Drawing Figures

U.S. Patent  Sep. 16, 1986  Sheet 1 of 3  4,611,996
FIG. 1
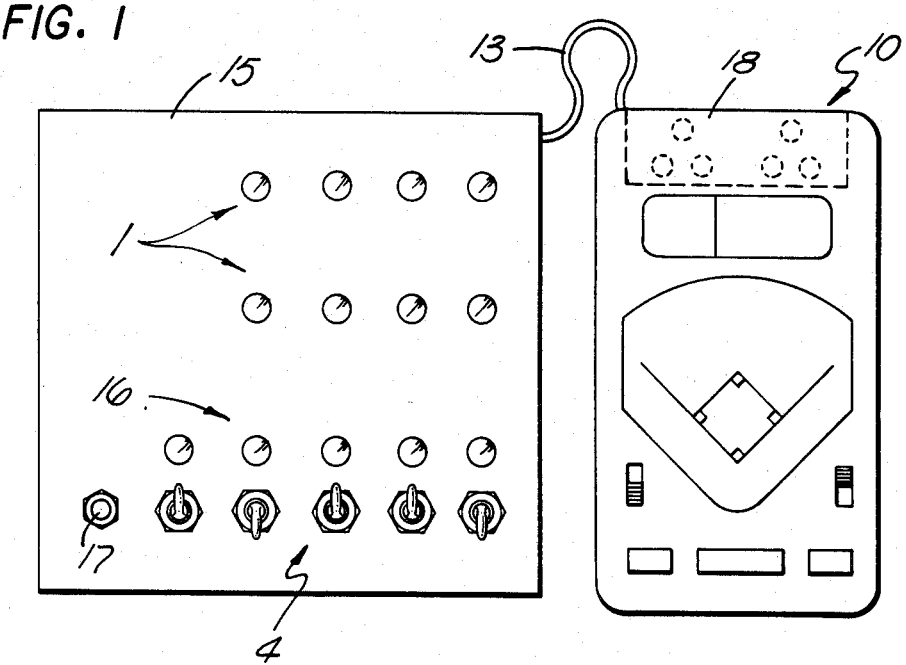
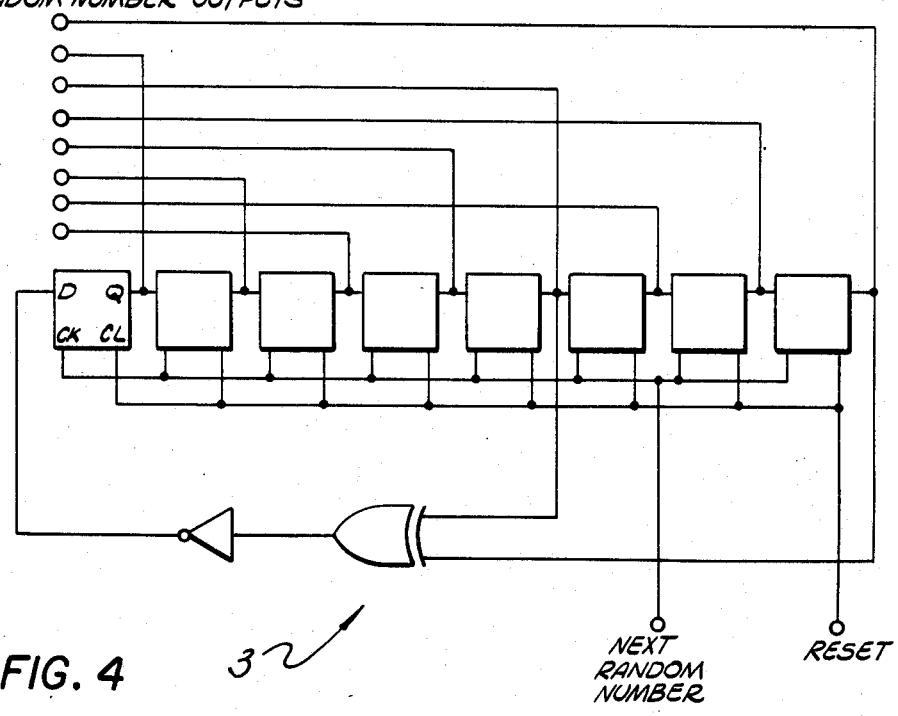
FIG. 4

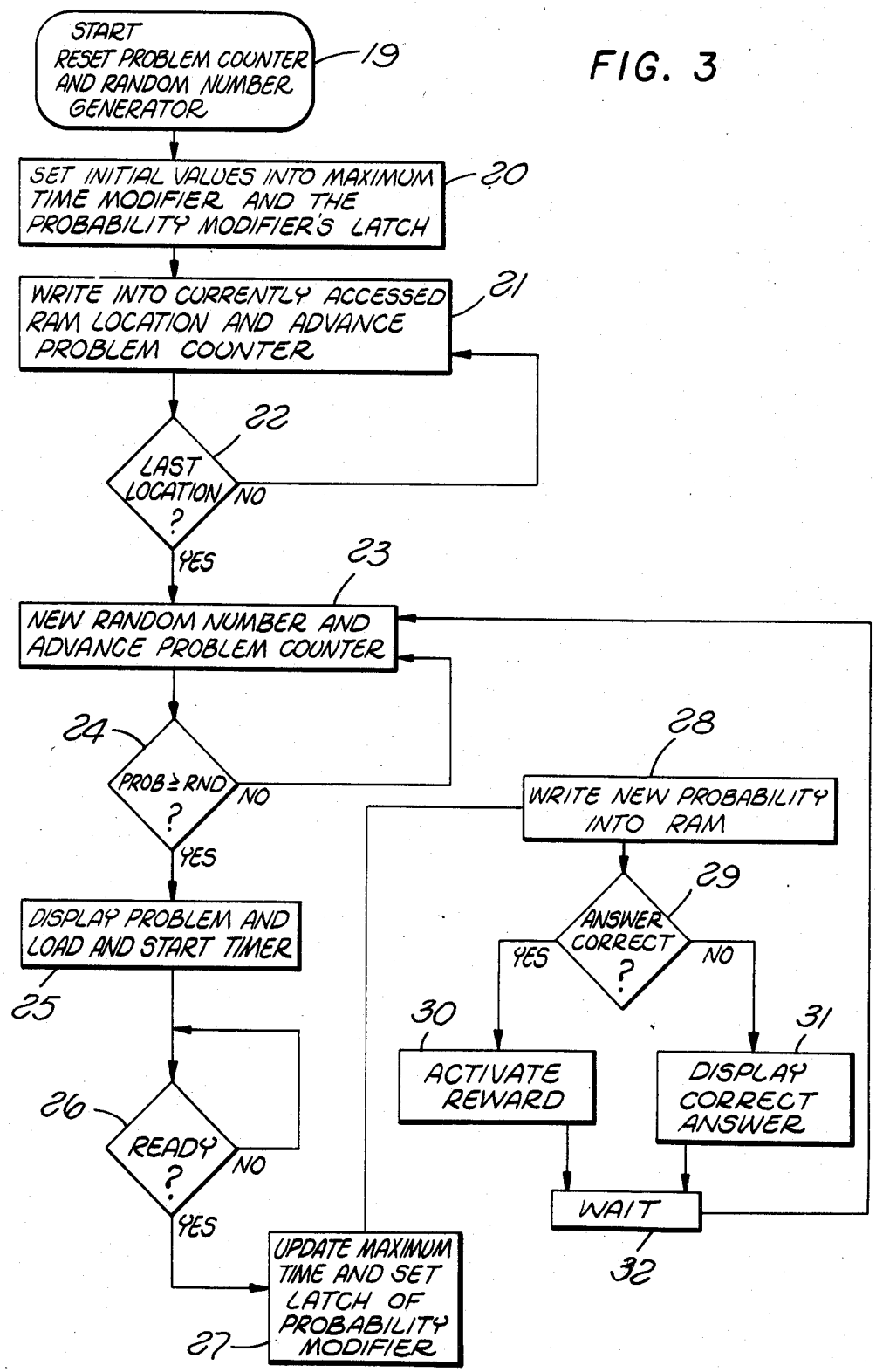

TEACHING MACHINE

This application is a continuation of application Ser. No. 289,130 filed 8/1/83 now abandoned.

BACKGROUND OF INVENTION

Many machines are available to drill students in various disciplines, however, their rewards are not sufficiently motivating to keep a student's interest up for a long enough period of time to memorize such dull fare as one's times tables for example. Also, in a situation like memorization of a table, concentration should be placed on the problems with which the student has trouble, and those problems should be repeatedly brought up. Present machines, with this capability, follow a rigidly programmed format and will not make the subtle adjustments necessary to optimize the learning process.

The present invention relates to teaching machines and more particularly to teaching machines designed to provide motivation to students, to teaching machines designed to detect and concentrate on student's areas of weakness, and teaching machines designed to increase student's speed. It is believed that the teaching machine of this invention represents a significant advance in the art which will result in its being widely adopted.

SUMMARY OF THE INVENTION

Briefly, the present invention comprises a teaching machine having a means for storing a probability associated with each of a plurality of problems, a means for selecting a problem from said plurality of problems in a random type of manner based on said probability for each problem, a means for presenting said problem to a student, a means to enter said student's response to problem, a means to determine virtue of said response, and a means to modify the probability associated with said problem based on said virtue.

Still further, this invention comprises a teaching machine having a means for presenting a problem to a student, a means to enter said student's response to problem, a means to determine virtue of said response, and a means to allow student to play a game based on said virtue.

This invention also comprehends a teaching machine provided with means for presenting a plurality of problems to a student, a means to enter said student's response to each problem wherein time allowed for said student to respond is limited, a means to determine virtue of said response, and a means to modify said time limit based on said virtue.

It is an object of this invention to provide a novel teaching machine.

It is also an object to provide an improvement of the teaching devices heretofore made available in this art.

These and other objects and advantages of this invention will be apparent from the more detailed description which follows, particularly when taken in conjunction with the accompanying drawings.

The teaching machine of this invention generally is provided with a means of receiving or selecting problems, a means of presenting problems, a means of receiving student's answers, a means of comparing student's answers with preferred answers, a means for rewarding said student for desired responses, a means for controlling the time in which said student is allowed to answer and a computing means.

In a preferred embodiment, after power on or reset, the machine begins by setting the probabilities associated with each of the plurality of problems to some value which for example could be the same for each problem.

To select a problem, the machine can select a random number, which for example can be in the range from zero to the sum of the probabilities associated with each of the said problems. Next, the machine sets a probability sum to zero. Then the machine begins with the first problem and then proceeds systematically through each of the problems, adding the probability associated with each of the problems to the probability sum. This process can continue, for example, until the probability sum equals or exceeds the random number. The problem which last had its associated probability added to the sum would be the selected problem. In this manner, all problems with equal probabilities associated with them are equally likely to be selected, problems with larger probabilities are more likely to be selected and problems with smaller probabilities are less likely to be selected.

It may be desirable, in some applications according to this invention, that the sum of probabilities associated with the problems be equal to the largest random number which can be generated if one desires a problem to correspond to every possible random number and that there be at least some probability that a random number will correspond to each problem. This restraint is not necessary, however. If, for example, one wants to display only a fraction of possible problems, the sum of the probabilities can greatly exceed the largest possible random number. This would mean that only a fraction of the plurality of problems can possibly be selected. Hereafter, this fraction will be referred to as the problems inside the window. Those not inside the window will be referred to as being outside the window. The problems can be arranged so that the more difficult ones are outside the window at first. Later as the easier problems within the window are mastered and their corresponding probabilities lessened, the more difficult problems enter the window, thus providing a means for automatic advancement.

Another means of using the probability would be by going systematically through all of the problems generating a random number for each problem. Should the random number exceed the probability associated with the particular problem, for example, the machine would skip that problem and proceed to the next problem generating another random number to compare it with. If the random number did not exceed the said probability, the problem to which the random number was associated would be selected. When the end of the plurality of problems is reached, the machine would start at the beginning again.

The teaching machine of the invention can also have a test mode wherein each of a plurality of problems can be selected once and once only. The machine can automatically tabulate such data as percent of problems answered correctly, or average time required to answer, for example. This can be done by either going once through the plurality of problems systematically, or by using the probabilities to scramble the order in which the problems occur. In the latter case, a flag can also be associated with each problem. At the beginning of the test, all flags can be cleared. The problems can, for example, be selected in a random type of manner based on the probabilities associated with each problem while excluding all problems having flags which have been set. When each problem is presented to the student, its flag can be set. When all the flags associated with each of the plurality of problems have been set, the test is over.

Once the problem has been selected, it is presented to the student by the presentation means. This presentation means can be a television receiver, for example, if the problem were mathematical in nature; or can be an audio speech synthesizer if the problem is of the spelling nature where the selected word can be difficult to display visually without revealing the nature of its spelling.

Next the student attempts to answer the problem entering his answer by the entry means. The entry means can be, for example, a numeric keyboard in the case of mathematical or multiple choice questions, or may be for example an alphabetical keyboard arranged alphabetically for spelling type problems. The presentation means can also echo the entry back to the student to allow verification of said student's response. The entry means can also have a clear key and an enter key so that accidental entries can be corrected before final entry when the machine compares the entry to the desired response.

The entry means, according to the invention, can also include a timing means to measure the time required by the student to answer the question and enter the time in addition to the answer. The timing means can also be used for limiting the time allowed for the student to answer the problem by, for example, automatically entering whatever answer had been keyed in after a delay of perhaps 15 seconds. This delay can be adjusted by the machine to keep pressure on the student so that the student will attempt to answer as quickly as possible. For example, the delay can be decreased slightly for each correct answer and increased substantially for each incorrect answer. In this manner, the delay self adjusts to where the student is able to answer most of the problems correctly within the allotted time, but occasionally is not able to answer in time. This provides occasional incentive for the student to answer more quickly.

After the student's answer has been entered, the machine compares the answer with the correct or preferred answer. The machine can have the answer in its storage means associated with the particular problem, may receive answers from an external source, or in the case of problems, such as those of a mathematical or logical nature, may calculate the correct answer. In some situations, for example, in subtraction or division, and when one desires to have only positive whole answers, it may be beneficial to select the answer and calculate the problem or to select the answer and part of the problem, then calculate the rest of the problem.

If the student answers incorrectly, the presentation means can be used to both correct him and provide a mild punishment. In a preferred embodiment, a television display shows both the problem and its correct answer while an unpleasant noise is generated by an audio speaker.

If the student has answered the question correctly, the machine can reward the student in a way which the student will consider meaningful. In a preferred embodiment where the presentation means is, for example, a television receiver, this reward can be a chance to play a video game on the presentation means for a fixed amount of time. The video game could be selected such that the game would have a determined outcome after a fixed amount of time so there would be no need to interrupt the game while it was in progress. Such a game can be, for example, landing an image of a spaceship on an image of a planet wherein the spaceship had insufficient fuel to attain escape from said planet. The game would logically conclude when the ship reached the planet, which must happen whatever the manner in which the fuel was burned.

The value of the reward can be adjusted based on the student's speed of response, the student's overall performance or any other virtue or combination of virtues which one may wish to encourage. The value of the reward can be adjusted by such means as increasing the time the student is allowed to play, or by changing to different games. In a preferred embodiment, when the student has demonstrated higher levels of both speed and overall ability, more exciting game segments can be used for rewards. The level of speed and overall ability can be determined from the previously mentioned delay used to limit the time allowed for the student to answer the question. If the student is able to bring this delay down to 2 seconds, for example, the student has demonstrated that he can answer a significant percentage of the problems correctly within the 2 seconds and the student can be rewarded with a more exciting game for as long as he maintained the short answer time.

When a student answers a problem incorrectly, it is desirable that the offending problem recur more often than the problems which the student answers correctly. This can be done by increasing the probability associated with the particular problem. If one desires to keep the sum of probabilities from exceeding the largest possible random number, the probabilities associated with each problem can be divided by the sum of all the probabilities and multiplied by the largest possible random number. This will set the sum of the probabilities equal to the largest possible random number. This process will hereafter be referred to as normalization.

If the problem was answered correctly, it should recur less frequently. In a preferred embodiment, the probability is decreased in inverse proportion to the time it took the student to answer the question. If the student were to answer slowly, the probability is decreased only slightly. If the student were to answer quickly, the probability would be decreased substantially and the problem would recur less frequently than it would have had it been answered slowly. As with incorrect answers, following a probability change, it may be desirable to normalize the probabilities.

Next, the machine will select another problem and repeat the entire sequence. This process can continue until the problems have been mastered or until the student has run out of time.

DESCRIPTION OF PREFERRED EMBODIMENTS

Figure 2:
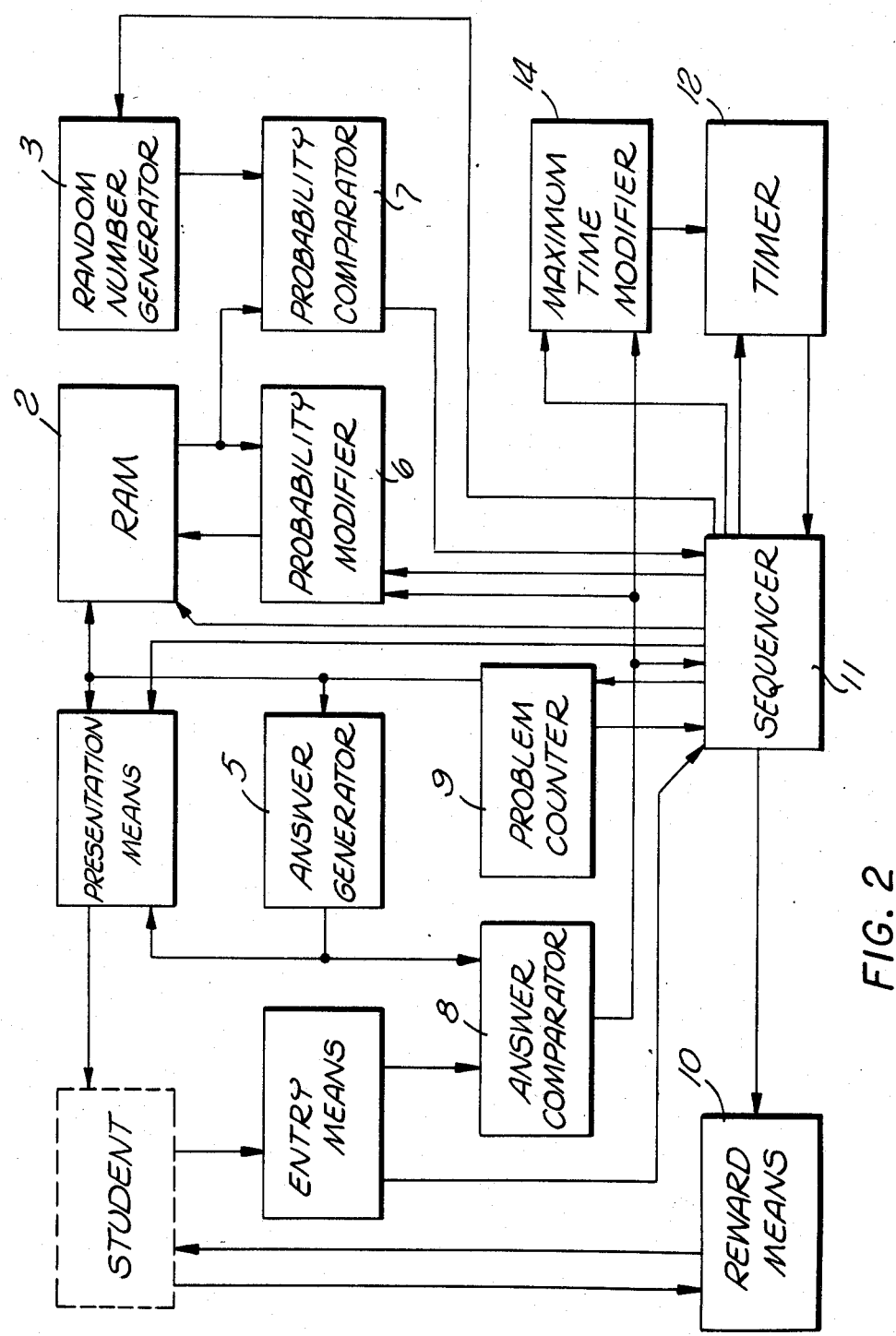

Turning to the drawings,

FIG. 1 Therein is shown a plain view of the teaching machine.

FIG. 2 Therein is shown a block diagram of the teaching machine.

FIG. 3 Therein is shown a flow chart of the sequencer.

FIG. 4 Therein is shown a schematic diagram of the random number generator.

The embodiment described in detail will be a machine to teach binary addition to a student. It is to be understood that this is not intended in any way to limit the scope of this invention. It is merely intended as an example of how the principles of the present invention could be applied.

Referring to FIG. 1 in greater detail, therein is shown a plain view of the teaching machine. Its presentation means (1 and 16) is composed of thirteen light emitting diodes (LED'S), eight of which (1) are turned on or off in combination to represent the two binary numbers which are to be added together. The eight LED'S are arranged in two groups of four LED'S each, representing two four-bit binary numbers. The remaining five LED'S (16) are used to display the correct answer when the student answers incorrectly. The entry means (4 and 17) is composed of five switches (4) and one push buttom (17). The student's answer is entered by the student via the said five switches and when the student is satisfied that his answer is correct, the push button is pressed to signal the machine to proceed. The reward means (10) is an electronic baseball toy connected to the teaching machine in such a way that the machine can pitch a ball to the student whenever the student answers correctly. The baseball game is unmodified except for that connection (13) and the restriction that the game is permanently set in its manual mode. Inside the teaching machine's enclosure (15), are the electronics which perform the functions of the present invention.

Referring to FIG. 2, therein is shown a block diagram of the electronics of the teaching machine. The random access memory (RAM) (2) stores the probabilities which are associated with each of the 256 possible problems which can be presented to the student. The RAM used is a 2101 manufactured by Signetics. It has eight address lines giving it 256 addressable locations which correspond to the 256 possible problems. Since the 2101 has only four data bits in each memory location, two 2101's are used to give a total of eight bits. This means that each probability can have a value between 0 and 255. The larger the number, the more likely that its corresponding problem will be selected.

The random number generator (3) will select a different eight-bit random number each time it receives a signal from the sequencer (11). Referring to FIG. 4, the generator comprises an eight-bit shift register, an exclusive-or gate and an inverter. The shift register must be reset to zero upon power on. The generator will generate a pseudo-random sequence of 217 different eight-bit numbers. It is necessary that the full cycle of the generator not be 256 numbers as this will inadvertently synchronize it with the problem counter (9) causing the same random number to always occur simultaneously with the same problem. The outputs of the shift register are scrambled to further randomize the number.

Returning to FIG. 2, the probability comparator (7) compares the magnitude of the output of the RAM (2) with the output of the random number generator (3). If the probability from the RAM equals or exceeds the random number, the comparator sends a signal to the sequencer (11) telling it so.

The problem selection counter (9) systematically cycles through all 256 different combinations of its eight-bit output, making one step per signal from the sequencer. Each combination represents one of the 256 possible problems which may be presented to the student. The eight-bit output of the problem selection counter is sent to three different parts of the teaching machine. First, the eight-bits are sent to the RAM (2) where they are used as the eight-bit address of said RAM. Second, they are sent to the eight LED'S (1) of the presentation means. Each of the eight-bits corresponds to one light. In this manner, the eight lights will indicate which of the 256 possible problems the machine was selected.

Third, the eight-bits from the problem selection counter are also sent to the answer generator (5). The answer generator of the illustrative embodiment will calculate the answer by adding four of the eight bits from the problem counter to the other four bits. The sum will be five bits wide including the carry output signal.

The entry means (4 and 17) is comprised of five switches (4) which are connected in such a manner that each switch will output the equivalent of a "0" or a "1" depending on the position of the switch. The student will use the switches to enter the answer the student feels is correct. Then after entering the answer, the student may send a "ready" signal to the sequencer (11) by pressing the push button (17).

The signals from the five switches of the entry means (4) and the five bit number from the answer generator (5) are sent to the answer comparator (8). The answer comparator compares the student's answer with the machine's answer and determines if they are the same. If they are the same, the answer comparator outputs an "answer correct" signal which is sent to the sequencer (11), the probability modifier (6), and the maximum time modifier (14).

When the reward means (10) is told to do so by the sequencer (11), the reward means will activate the game. The particular reward game used is the "baseball 3" game manufactured by Entex Industries of California. The game is permanently set in the manual mode so that the pitches are controlled by four of the buttoms on its hidden rear panel (18 FIG. 1). One of these buttons is bypassed by an NPN transistor so that the button can be controlled by the teaching machine. Said rear panel can be removed and disassembled and it has six colored wires connected to it. The collector of said transistor is connected to the yellow wire and the emitter to the black wire. The black wire is also connected to the teaching machine's ground and the base of said transistor is connected through a 10K resistor to a TTL signal. For every correct answer that the student makes, he will get one ball pitched to him. In every other respect, the game is a normal baseball toy. The baseball game has its own presentation and display means and so will not need to be interfaced through those all ready set forth (1 & 4).

The probability modifier (6) will select which new probability to assign to each problem for future use. Correct answers will lessen the probability by 30% or by one binary step whichever is greater and incorrect answers will make the recurrence probability ten times as great as it was. Of course, the limits of the eight-bit number cannot be exceeded. Because this is a fairly complex calculation and in order to simplify the circuitry, the new probability is read from a 1024 by eight-bit read only memory (ROM) programmed like a look up table, the address lines of the ROM are connected to the eight-bits of the old probability and to the "answer correct" signal for a total of nine address lines. Thus, associated with each old probability, are two different new probabilities which may be substituted, a larger one for a wrong answer and a smaller one for a correct answer. The address lines will select which of the new probabilities is to be loaded back into the RAM (2). The 10th address is used to override the normal data so that the ROM will only output an initial starting probability.

This is done by programming the initial probability into every memory location which has the 10th address line high. Also, the probability modifier contains an eight-bit latch to keep the updated probability stable while it is being loaded back into the RAM. The ROM used is a 2758 type EPROM manufactured by Intel of California.

Also, there is a time limit circuit (12). This circuit limits the amount of time in which the student is allowed to answer. A maximum count is loaded from the maximum time modifier (14) into the eight-bit counter in the time limit circuit each time a new problem is presented to the student. The counter counts down at the rate of ten counts per second. This makes the largest allowable time equal to 25.5 seconds. When the count reaches zero, a signal is sent to the sequencer (11) notifying it that the student has run out of time. When the student has answered, if he does not wish to wait for the entire count, the student may speed up the process by pushing the "ready" button (17).

The maximum time modifier (14) adjusts the maximum time that the student is allowed in which to answer. The maximum time modifier works on the same principle as the probability modifier (6). Updated maximum time limits are read from a 1024 by eight-bit ROM which has been programmed as a table, into a maximum time register which is an eight-bit type "D" register. Eight of the address line inputs are connected to the outputs of said register. The 9th address line is connected to the "answer correct" signal. The 10th address will cause an initial value to be loaded into the maximum timer count register. The differences are: First, there is only one maximum time register, not one for each problem. Second, the maximum times are modified according to a different function. For incorrect answers, six more counts are added to the maximum time and for correct answers, the count is decreased by two percent or one count, whichever is larger. As with the probability modifier circuit, the limits of the eight-bit number cannot be exceeded.

The sequencer (11) is the part of the teaching machine which controls what happens at which time.

Referring to FIG. 3, first the teaching machine is reset (19). This includes resetting the problem counter and the random number generator to zero. Immediately after power on or reset, the controller follows a sequence which will set all of the probabilities to the same number. First (20) the 10th address bits on the probability modifier (6) and the maximum time modifier (14) are held high and the latch of the probability modifier is set. This will hold the initial probability on the inputs to the RAM (2). At the same time, the register of the maximum time modifier is loaded with its initial value. Next (21) the memory write line of the RAM (2) is pulsed, storing the probability in the currently accessed memory location. Also, the problem counter is incremented so that the next memory location will be accessed. This process is repeated (22) until every memory location has been filled with the initial starting probability. When the problem counter has accessed the last memory location, the counter sends a signal back to the sequencer (11). When this signal is received (22), control drops down to the main loop (starting with 23).

The main loop begins as follows: First, a new random number is selected by sending a signal to the random number generator (3) and the problem counter is incremented so that a new probability is presented for comparison. If the random number is larger than the probability selected (24), a new random number is generated and the problem counter will be incremented again presenting still another probability for comparison (23). This loop will continue until a probability equals or exceeds a random number (24) at which point, whichever problem that the problem selection counter (9) is pointing to is the selected problem; that problem is presented to the student and the timer is started (25).

Next, the machine waits for a "ready" signal from either the timer timing out or from the student pressing the "ready" button (26). Next (27), a signal is sent to the probability modification circuit to hold the new probability in the eight-bit latch. At the same time, the maximum time modifier (14) is signaled to update the maximum time in which the student is allowed to answer. Next (28), the new probability is stored in the RAM. The sequencer then checks to see if the student's answer was correct (29) and if it was, the machine activates the reward means (30). Otherwise, the presentation means is caused to display the correct answer (31). Finally, the sequencer pauses briefly (32) to allow the reward sequence to finish or to allow the student to read the correct answer and try to memorize it before the next problem is presented. This also gives the student a chance to remove his finger from the "ready" push button (17) before the next problem is presented. The sequencer then returns to the beginning of the main loop (23) and continues until the student has mastered the subject matter or has run out of time.

If should be apparent to one skilled in the art that the above-described embodiment is merely one illustration of the many possible embodiments which would represent the present invention. It is intended that the invention be defined solely by the following claims interpreted in the light of the foregoing specification.

I claim:

1. A unitary electronic teaching and game apparatus comprising:
   a teaching element including:
   a means to present a problem to a student,
   a means to enter said student's response to a problem, and
   a means to determine virtue of said response,
   and a game element including a means which presents a game to the student based on said virtue;
   said teaching element and said game element being operatively interconnected so that the teaching element triggers the operation of the game element.

2. The apparatus of claim 1 wherein the game element is a video game.

3. The apparatus of claim 1 wherein said game element includes means to provide a fixed outcome after a given amount of time.

4. The apparatus of claim 1 wherein said teaching element includes means whereby virtue is based, at least in part, upon the speed of the student's response to said problem.

5. The apparatus of claim 1 wherein said teaching element includes means whereby virtue is based, at least in part, on the accuracy of the student's said response to said problem.

6. The apparatus of claim 1 wherein the said teaching element includes means for activating the means which presents a game only if said virtue exceeds a predetermined level.

7. The apparatus of claim 1 wherein said teaching element includes means for causing the means which presents a game to present a more exciting game if said virtue exceeds a given level.

8. The apparatus of claim 1 wherein said teaching element includes means for causing the means which presents a game to present a game based on cumulative virtue of preceding responses.

9. The apparatus of claim 8 wherein said teaching element includes means for causing the means which presents a game to present a more exciting game when a given level of cumulative virtue has been attained.

10. The apparatus of claim 1 wherein said game element includes a computer game.

11. The apparatus of claim 1 wherein said teaching element includes a means for storing a plurality of problems and the answers thereto.

12. The apparatus of claim 11 wherein said teaching element includes means whereby virtue is based, at least in part, on comparison with the stored answer to a problem.

13. The apparatus of claim 1 wherein said teaching element includes a means to generate a plurality of problems.

14. The apparatus of claim 1 wherein said teaching element includes computing means to generate answers to said problems.

15. The apparatus of claim 14 wherein said teaching element includes means whereby virtue is based, at least in part, on comparison with said generated answer.

16. The apparatus of claim 1 wherein said teaching element includes a means to select the answer and calculate at least part of the problem.

17. A teaching machine comprising:
a means for storing a probability associated with each of a plurality of problems,
a means to generate a random number,
a means to systematically add probabilities associated with said problems to a sum,
a means to select a problem by comparing sum with said random number,
a means for presenting said problem to a student,
a means to enter said student's response to said problem,
a means to determine virtue of said response, and a means to modify the probability associated with said problem based on said virtue.

18. The invention set forth in claim 17 including means to cause the problem whose associated probability which, when added to the sum, caused the sum to exceed the said random number is the selected problem.

19. The invention set forth in claim 17 further including a means to cause the largest possible random number to be equal to the sum of the probabilities.

20. A teaching machine comprising:
a means for storing a probability associated with each of a plurality of problems,
a means to generate a random number,
a means to compare said random number with the probability associated with one problem,
a means to select a problem by systematically performing the said random number selection and said comparison for each of the plurality of problems,
a means for presenting said problem to a student,
a means to enter said student's response to said problem,
a means to determine virtue of said response, and
a means to modify the probability associated with said problem based on said virtue.

21. The invention set forth in claim 20 including means to cause the first problem whose probability exceeds the random number is selected.

22. The invention set forth in claim 20 including means whereby the last problem of the plurality has been processed, the process continues with the first problem.

23. The invention set forth in claim 20 including means to case the selection process for each problem to begin where it left off for the last problem.

* * * * *

UNITED STATES PATENT AND TRADEMARK OFFICE
CERTIFICATE OF CORRECTION

PATENT NO. : 4,611,996
DATED : September 16, 1986
INVENTOR(S) : Donald W. Stoner It is certified that error appears in the above-identified patent and that said Letters Patent are hereby corrected as shown below:

On the title page Item (63) should read
-- [63] Continuation of Ser. No. 289,130, Aug. 3, 1981, abandoned. --

Signed and Sealed this

Twentieth Day of January, 1987

*Attest:*

DONALD J. QUIGG

*Attesting Officer*  *Commissioner of Patents and Trademarks*